Figure 1:
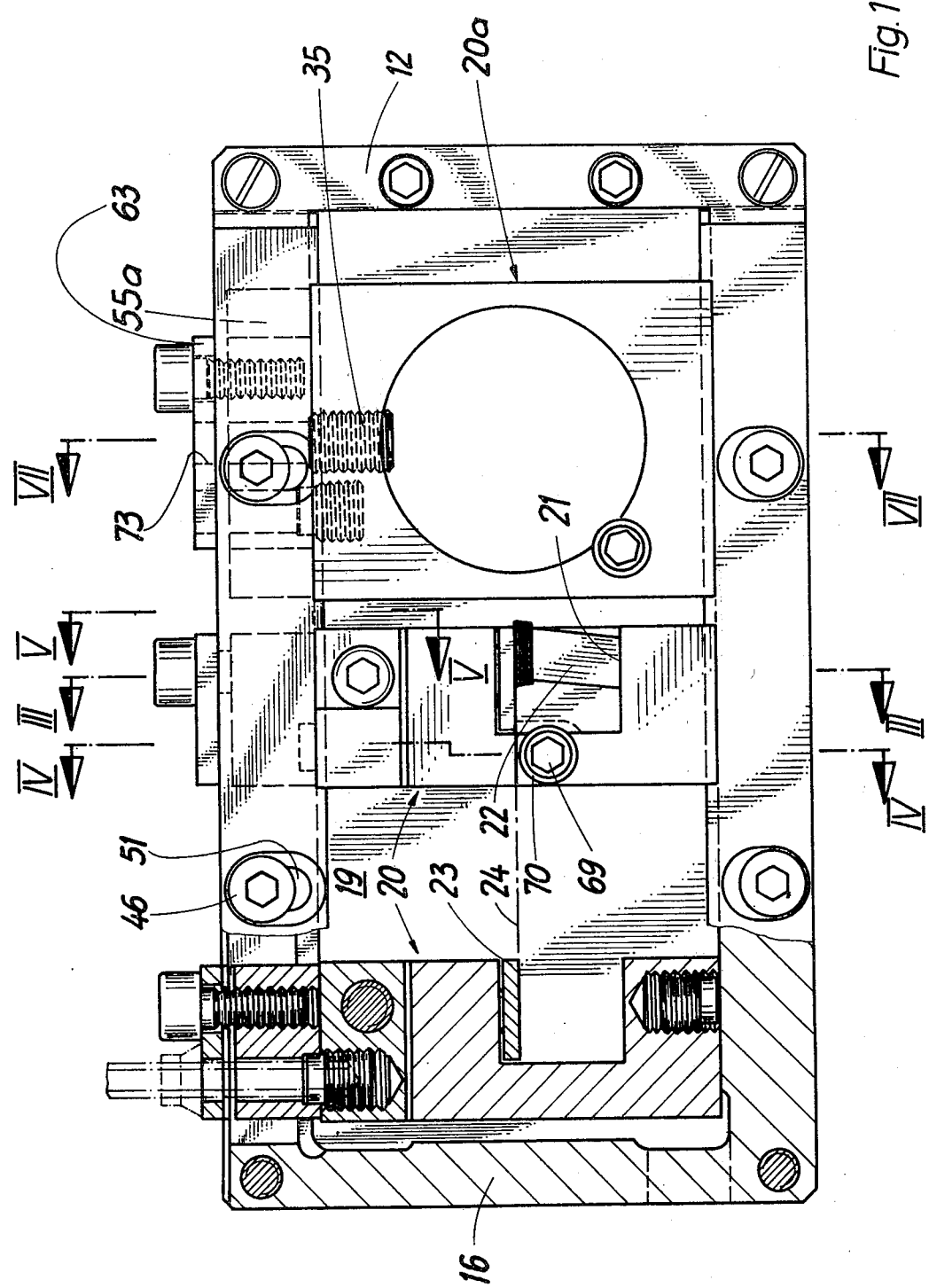

United States Patent [19]

Scheiffele

[11] 3,982,452
[45] Sept. 28, 1976

[54] TOOL CLAMPING DEVICES

[75] Inventor: Helmut Scheiffele, Schwaikheim, Germany

[73] Assignee: Hahn & Kolb, Germany

[22] Filed: June 2, 1975

[21] Appl. No.: 582,894

[30] Foreign Application Priority Data

June 6, 1974 Germany............................ 2427413

[52] U.S. Cl................................... 82/36 R; 29/96; 29/97
[51] Int. Cl.[2]...................... B23B 29/00; B26D 1/00
[58] Field of Search............... 29/96, 105 R, 105 A, 29/97; 82/36

[56] References Cited
UNITED STATES PATENTS

| | | | |
|---|---|---|---|
| 745,976 | 12/1903 | Tindel............................... | 82/36 R |
| 3,270,396 | 9/1966 | Williams........................... | 29/105 A |

FOREIGN PATENTS OR APPLICATIONS

| | | | |
|---|---|---|---|
| 519,318 | 3/1955 | Italy................................... | 82/36 R |

*Primary Examiner*—Harrison L. Hinson
*Attorney, Agent, or Firm*—Brumbaugh, Graves, Donohue & Raymond

[57] ABSTRACT

A tool clamping device comprises a support which is mounted on or is adapted to be mounted on the bed, carriage or saddle of a turning machine, such as a lathe. A tool holder, in which a tool is clamped, is itself clamped between two mutually facing parallel clamping surfaces on the support by spreading means. Prior to clamping the tool holder between the clamping surfaces it is guided by at least one guide on the support, e.g. during coarse and fine adjustment of the position of the tool holder. The latter is also provided with actuation members for the tool clamping means and the spreading means. The tool can be clamped to the tool holder while the latter is removed from the support so as to form a replaceable tool cartridge.

18 Claims, 9 Drawing Figures

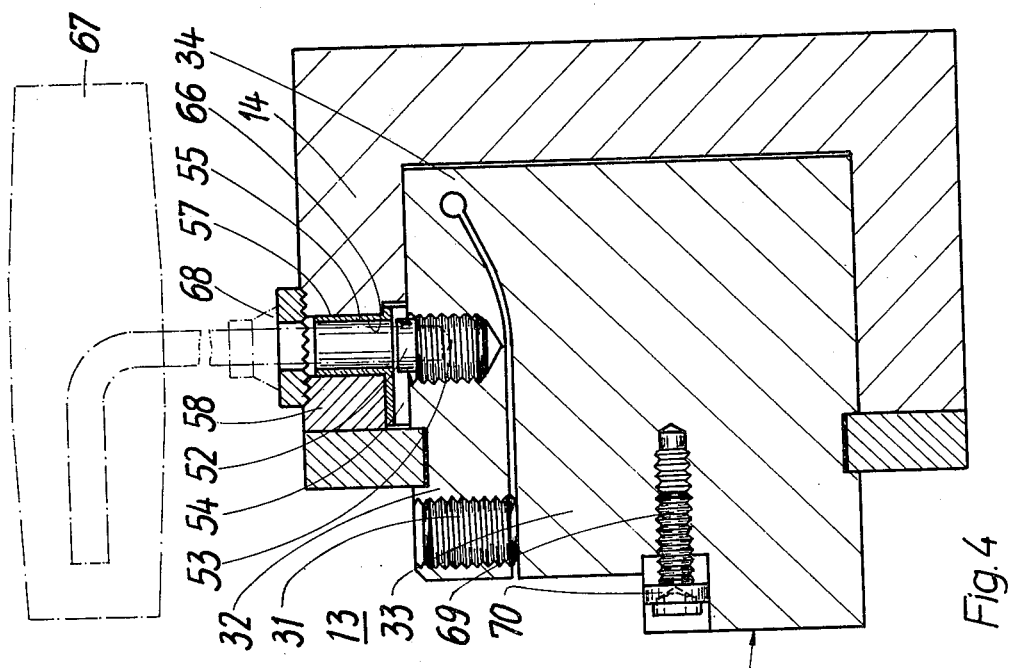
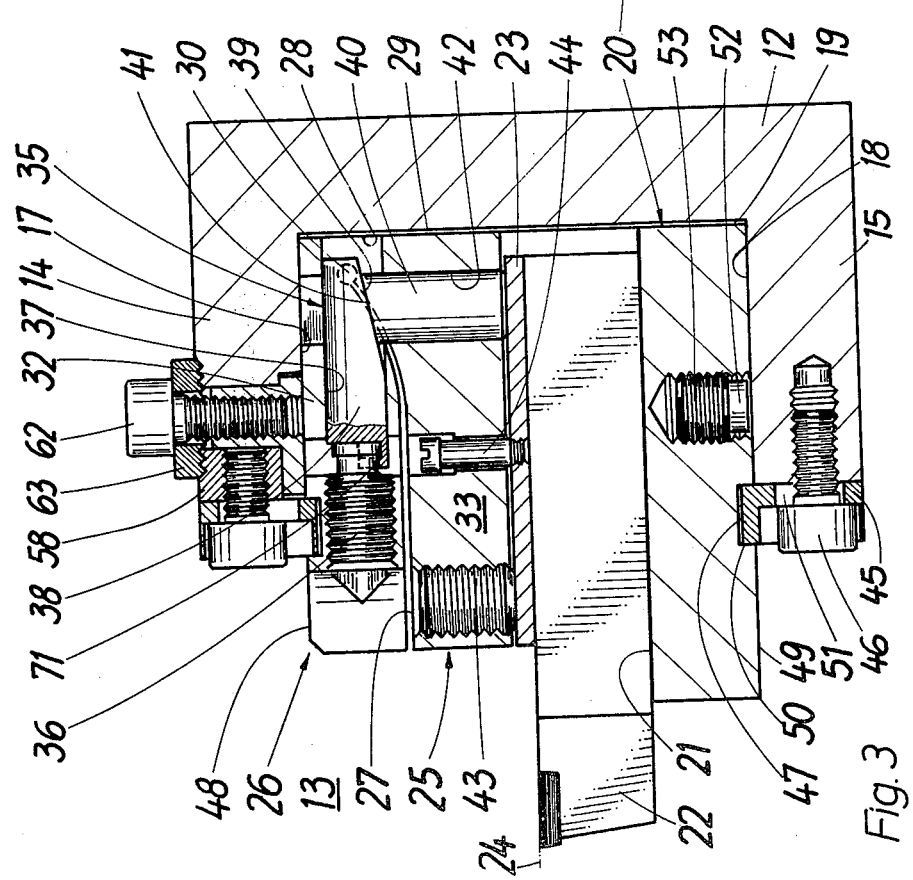

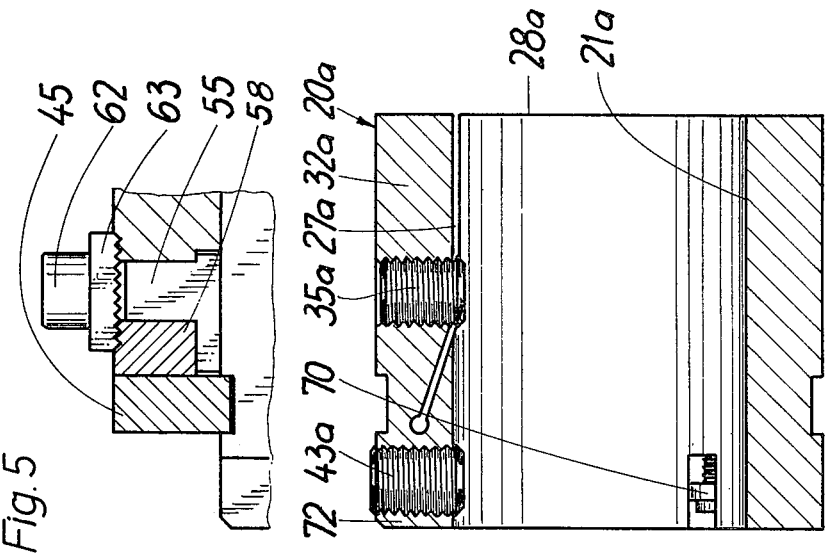
Fig. 5
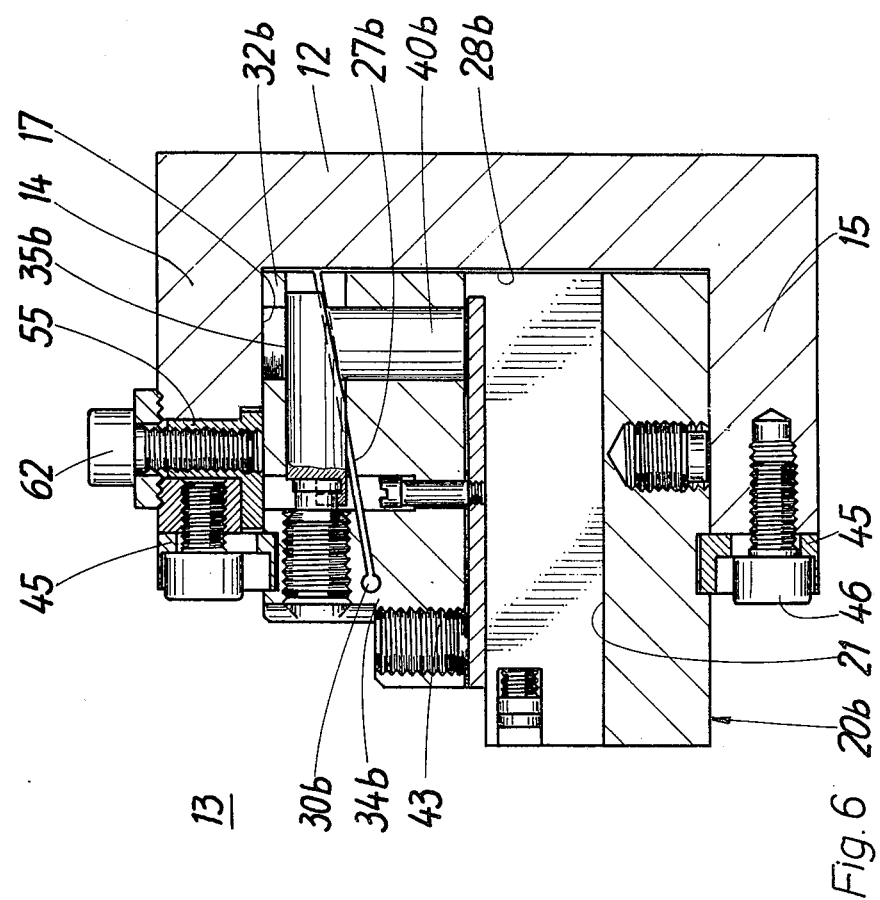
Fig. 6
Fig. 7

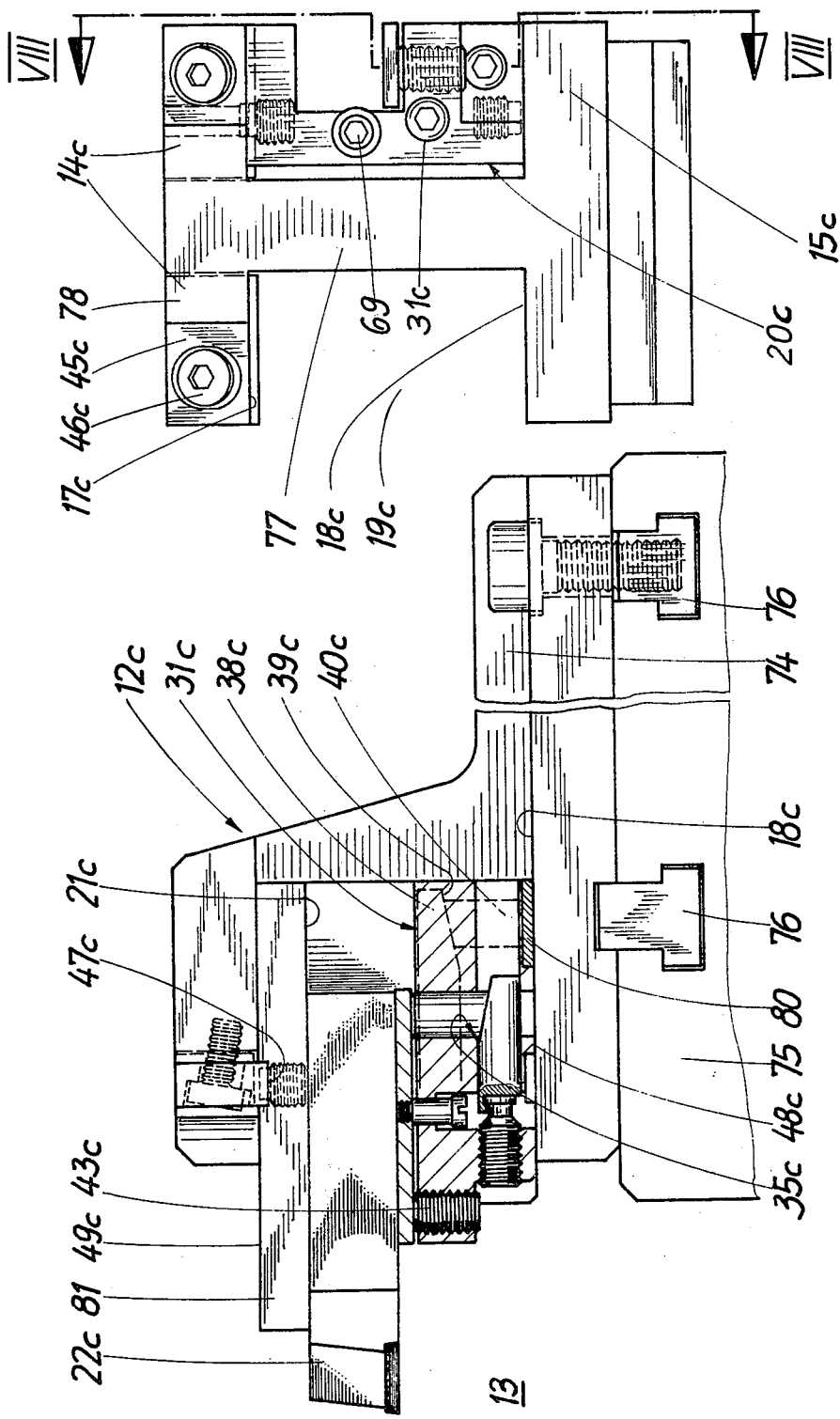

TOOL CLAMPING DEVICES

The invention relates to a tool clamping device for a turning machine in which a support is mounted on or can be mounted on the turning machine and in which at least one tool holder can be clamped to the support.

Tool clamping devices of this type are widely used. The tool itself which may for example be a turning tool is clamped to a tool holder and may be brought into a preset longitudinal position with respect to said tool holder. For its part the tool holder is then secured to a support, a clamping head or the like. Hitherto the demand for simple replaceability and necessary rigidity of the mounting has not been met satisfactorily; moreover it is difficult to mount several tools close to one another, for example in order to enable several cuts to be made simultaneously.

It is therefore a feature of the invention to provide a tool clamping device of the initially mentioned type which substantially eliminates these disadvantages.

In accordance with the invention a tool clamping device for a turning machine comprises a support which is mounted on or which is adapted to be mounted on the turning machine and which has two rigid parallel mutually facing clamping surfaces and at least one guide parallel to the clamping surfaces, and at least one tool holder on which at least one tool can be mounted and which comprises an insert which can be inserted between the clamping surfaces and guided by the guide and which has clamping means for the tool, spreading means by which said tool holder can be expanded to clamp it between the clamping surfaces and actuation members for said clamping and spreading means.

It is thus possible for several inserts or tool holders to be clamped close together in a support, which inserts have been preset with respect to their precise position but which may be adjusted by displacement along the guides in the support. The clamping and the spreading means are preferably accessible from the front and the insert can also be replaced from the working side of the tool. The tool can be clamped in the insert or tool holder with precision whilst the latter is removed from the support. The tool holder and tool thereby form a replaceable tool cartridge.

Figure 2:
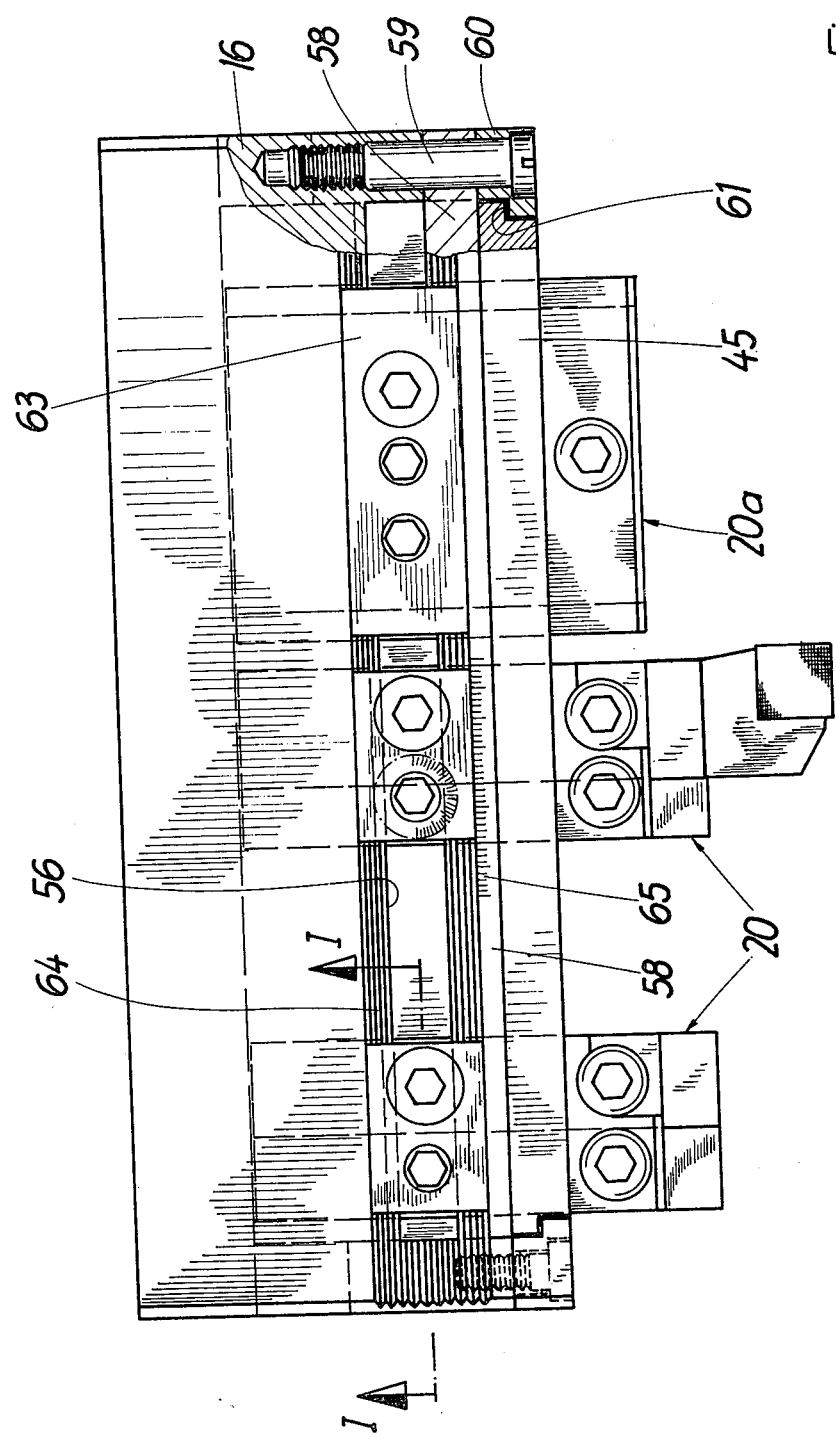

The invention is further described, by way of example, with reference to the accompanying drawings, in which:

FIG. 1 is a front elevation of a tool clamping device according to the invention in partial section on the line I—I in FIG. 2, FIG. 2 is a plan view of the device of FIG. 1, FIG. 3 is a section on the line III—III in FIG. 1, FIG. 4 is a section on the line IV—IV in FIG. 1, FIG. 5 is a detail in section on the line V—V in FIG. 1, FIG. 6 is a cross section, similar to FIG. 3, illustrating another embodiment of insert, FIG. 7 is a section through a further embodiment of an insert on the line VII—VII in FIG. 1, FIG. 8 is a section on the line VIII—VIII in FIG. 9, and FIG. 9 is a front elevation of the device of FIG. 8 (in this FIGURE viewed from the left).

A tool clamping device 11 as shown in FIGS. 1 to 5 has a support or tool post 12 which may for example be mounted on the saddle of a turning lathe. The mounting may be effected during construction of the machine, or the support may be screwed securely to the saddle or it may be clamped by means of any type of clamping device. The support 12 is in the form of a box open towards the working side 13 and having an upper side wall 14 and a lower side wall 15 and also end walls 16. The inner surfaces of the long side walls 14 and 15 of the support 12, which surfaces face the interior 19 of the support 12, form clamping surfaces 17 and 18 which are parallel to one another.

Inserts 20 and 20a which form tool holders are disposed in the interior 19. The inserts 20 are each in the form of a thick plate which is inserted between the clamping surfaces 17 and 18 and whose dimensions in the longitudinal direction of the clamping surfaces are smaller than the distance between these surfaces. The inserts 20 each have a lateral recess 21 for receiving a tool 22 which in this case is a turning tool 22 having a square or rectangular shank. A clamping device 25 is contained in the insert and includes a clamping plate 23 to enable the tool to be clamped in the insert. The upper edge of the tool lies on a reference plane 24 which may for example be a plane through the main axis of rotation of the turning machine which runs parallel to the clamping surfaces 17 and 18.

Furthermore the insert 20 has a spreading device 26 which is formed by a slit 27 which in the case of the insert 20 is open towards the working side 13 and ends in a bore 30 a short distance before the rearside 28 of the insert lying close to the base 29 of the support. The front portion of the slit 27 runs approximately mid-way between the clamping plate 23 and the clamping surface 17 and parallel thereto and in the region towards the rearside it is bent up and ends in the region of the edge between the surface of the insert which abuts against the clamping surface 17 and the rear side 28. One actuation member of the spreading device 26 comprises a screw 31 in the upper portion 32 of the insert defined by the slit 27 i.e. in the portion which is located towards the clamping surface 17, and is arranged in a part of such upper portion which projects outwardly from the interior 19 of the support. The screw 31 has its axis vertical and presses against the portion 33 lying beneath the slit 27 and thereby, during slight resilient bending of the bridging portion 34, which acts as a hinge, spreads the portion 32 in an upward direction against the clamping surface 17.

The spreading device 26 also includes an actuation member 35. The actuation member 35 comprises a screw 36 which is screwed horizontally in the upper portion 32 and which presses against a bolt 38 disposed in a horizontal bore 37 and having a wedge surface 39 on its lower side. This wedge surface cooperates with an oblique end face 41 of a clamping bolt 40 which can be displaced in a vertical bore 42 i.e. a bore which is perpendicular to the clamping surfaces. The flat wedge surface 39 could be replaced by a conical wedging surface. The clamping bolt 40 presses against the clamping plate 23, thereby on the one hand clamping the shank of the tool 22 in the accommodating recess 21, but also on the other hand pressing the portion 32 upwards against the clamping surface 17 although with less force than the screw 31. The actuation member 35 thus both forms a part of the clamping device 25 and also part of the spreading device 26. Moreover the clamping device 25 has an actuation member in the form of a screw 43 which is screwed perpendicularly into the portion 33 and whose sole function is to press against the clamping plate 23 which is held captive by means of a screw 44.

Guides 45, which are in the form of bars are provided on the front faces of the side walls 14 and 15, extend along the entire length of the side walls and are secured by means of screws 46 to the side walls. The guide bars 45 fit into grooves 47 on the upper and lower surfaces 48 and 49 of the insert. Thus there is provided a guide means effective in a direction parallel to the front faces to enable the inserts to be guided accurately and displaced within the interior 19. Accordingly, the front and rear faces of the guide bars 45 cooperate with corresponding guide surfaces 50 of the grooves 47. Screws 46 engage through slots 51 in the bars 45 so that when the screws 46 have been loosened the bars can be pushed outwards out of the groove 47 so that an insert can be removed from the interior 19, towards the working side 13 subsequent to the release of the spreading device 26.

So as to enable the insert to be moved with precision by small amounts along the guides 45, an eccentric 52 is provided on an eccentric screw 53 which is screwed into the portion 32 of the insert as shown in FIG. 4 and is constructed so as to be self-locking. The eccentric 52 protrudes above the upper surface 48 of the insert 20 and projects into a slot 54 of an adjusting member 55 which has an inverted T or L shape (see FIG. 5) and is displaceable in a longitudinal slot 56 (see FIG. 2) which extends through the side wall 14 and substantially along its entire length. In the illustrated embodiment, the longitudinal slot 56 is defined on one side by the front face 57 of the side wall 14 and on the other side by a bar 58 which is screwed to the front wall 16 by means of screws 59. Guide parts 60 (see FIG. 2) which are also screwed on by means of the screws 59 engage a notch 61 of the guide bars 45 from behind and independently of the screws 46 provide vertical guiding of the guide bars 45.

The adjusting member 55 is secured by means of screws 62 which press against a serrated bar 63 whose serrated lower face cooperates with longitudinal serrations 64 of the mutually adjoining regions of the side wall 14 and the bar 58. This common serrating ensures that the bar 58 achieves a good connection with the side wall 14. A scale 65 (see FIG. 2) which may for example commence from a zero line, may be provided on the bar 58 and aid in determining longitudinal positions of the inserts.

Access to the eccentric screw 53 may be had by way of a bore 66 in the adjusting member 55 and the eccentric screw 53 can be adjusted by means of a tool 67 (shown in chain-dotted lines in FIG. 4) which engages in a hexagonal socket in the eccentric screw. A collar 68 having a scale for fine adjustment may be provided on the tool.

An eccentric screw 53 with a eccentric 52 is also provided on the lower side 49 of the insert so that the insert may be turned through 180°, for example for overhead turning.

An adjusting screw 69 which is screwed in parallel to the tool shanks has a collar 70 which engages a recess in the tool shank and serves to enable fine adjustment thereof in the direction of the shank.

The embodiment described with reference to FIGS. 1 to 5 enables the following operation. The insert 20 is provided with a tool 22 in that the latter is inserted into the accommodating recess 21 and is secured by means of the screw 43. The adjusting screw 69 serves to facilitate adjustment in the direction of the tool shaft, and the eccentric screw 62 enables adjustment in a transverse direction. These adjustments may also be effected outside the turning machine on a measuring machine which preferably has a support or tool post corresponding to the support or tool post 12. The tool holder or insert with the tool fitted thereby forms a tool cartridge.

The tool cartridge is then inserted into the support 12 the screws 46 having been loosened and the guides 45 having previously being displaced outwardly. The guide bars 45 are then again pushed inwards and secure the tool holder or insert such that its side faces lie perpendicular to the guides 45. The insert 20 can then be pushed roughly by hand into the desired position within the interior 19. During insertion of the insert 20 the eccentric 52 is pushed into the slot 54 of an adjusting member 55 belonging to the insert 20 so that during the rough displacement the adjusting member 55 moves together with the insert. The adjusting member is then secured by tightening the screw 62, this is the basic adjustment. The eccentric 52 can be turned by means of the tool 67 so that a fine adjustment of the insert is possible as a readjustment in the machine parallel to the guides. The actuation members 31 and 35 of the spreading device are then securely clamped, in the course of which a final clamping of the tool 22 is simultaneously effected by way of the actuation member 35. On account of its relatively slight spreading action the actuation member 35 may also be used to achieve a desired resistance to movement of the insert in the recess 19 during the adjustment.

As can be seen from FIGS. 1 and 2 a plurality of tool holders or inserts can be clamped next to one another in the support 12 such that the distance between the tools is relatively small. Nevertheless any one insert may be replaced at any time without its own basic adjustment or the precision adjustment of the other inserts being altered. To this end the actuation members 31 and 35 are released and when the screws 46 have been loosened the guides are displaced upwards so that the insert in question may be removed. The other inserts remain clamped by means of their spreading devices so that the displacement of the guides does not affect them. The release of the actuation device 35 has no effect on the tools 22 since the mere displacement is quite adequately prevented by means of the screw 43, moreover the actuation member 35 does not usually have to be completely released so that additional clamping of the tool is also provided from this quarter. Since the screw 36 on the one hand, and the wedge surfaces 39 and 41 of the actuation member 35 on the other hand are self-locking, a tensile connection 71 in the form of a lug which engages behind a collar is provided between the screw 36 and the bolt 38.

FIG. 6 shows an embodiment of an insert 20b which with respect to its basic dimensions and in numerous details corresponds to the insert 20 of FIGS. 1 to 5. The support 12 is identical to the support in accordance with the described embodiment; the same reference numerals denote the same parts.

The basic difference from the insert 20 described is that the slit 27b is open towards the rear side 28b. Consequently the bore 30b and the thin vertical connecting portion 34b lie on the working side 13 of the insert. The groove 27b runs downwards obliquely from the rear side i.e. it runs at a slight incline or straight down to the accommodating recess 21.

An actuation member 35b is provided which in arrangement and construction corresponds exactly to the actuation member of FIG. 3. However its action with respect to spreading is substantially greater since the clamping force produced by the reaction from the clamping bolt 40b engages with a much larger lever arm and can thus spread out the portion 32b alone sufficiently far for adequate securing to be ensured. Nevertheless the bolt 40b also acts upon the tool 22 to effect clamping. In addition the tool is secured by means of the clamping screw 43, which is provided for this sole purpose. Thus, in this embodiment, while achieving substantially the same action, one actuation member i.e. the screw 31 can be dispensed with although one of the screws is available solely for clamping the tool.

The embodiment of insert shown in FIG. 7 is the insert 20a which is shown in FIGS. 1 and 2. It has a tool accommodating recess 21a which is in the form of a bore and which is constructed for a tool having a corresponding shank. In principle all types of tool shanks or the like may be accommodated in an insert according to the invention, for example deep angled tapers, adjusting sleeves or other types of shank. Instead of clamping the tool directly in the accommodating recess it is also possible to clamp a tool holder, for example a drill rod, which is able to carry several tool cutting edges. Nor is it imperative for the tool to extend in the shank direction shown but instead may be clamped obliquely, either directly or with the interpolation of a tool holder.

The slit 27a of the insert 20a likewise extends from the rear side 28a towards the front. It extends horizontally until reaching the approximate middle of the insert and then extends at a slight incline. Since the accommodating recess 21a is very large the slit 27a extends into said recess. An actuation member in the form of a screw 43a is disposed for the sole purpose of clamping the tool in the non-expandable part 72 which projects from the interior 19 of the support and has vertical access, whilst an actuation member in the form of a vertical screw 35a is screwed into the expandable portion 32a said screw 35a serving to press upon the tool and also to expand the insert. As can be seen in FIG. 1, the screw 35a can be actuated through an aperture 73 in the adjusting member 55a. The adjustment of the eccentric is effected in the manner described with reference to FIG. 4.

Using this insert, a tool having a very large shank diameter can be clamped. Nevertheless, as in the other embodiments the insert may be constructed in one piece and in a particularly simple form. It can also be seen that the appropriate adjusting member 55a has a dimension which matches the insert width which in this case is larger.

The embodiment shown in FIGS. 8 and 9 has a support or tool post 12c which is combined with an attachment 74. Mounting on a bed, carriage or saddle 75 of a turning machine is effected by way of T-shaped clamping parts 76. The support 12c is not box-shaped but is TT or H-shaped, and clamping portions 14c and 15c extend to both sides from its middle web 77. These clamping portions 14c and 15c have the same function as the side walls 14 and 15 in the initially described embodiment and their sides which are directed towards the inner interiors 19c form clamping surfaces 17c and 18c.

As can be seen from FIG. 8 the guides 45c comprise shor bar shaped portions which are disposed only on the upper clamping portion 14c and which project behind a protrusion 78 of the clamping portions in part for the purpose of guiding and may be secured by means of screws 46c. Otherwise their shape and their cooperation with the groove 47c is the same as in FIG. 3. In FIGS. 8 and 9 the insert is used for overhead cutting. The clamping of the insert in the support 12c is effected by way of an actuation member 31c which, like the actuation member 35 in FIG. 3, has a horizontal screw (not shown) which acts upon a bolt 38c having a wedge surface 39c. In the embodiment shown the wedge surface 39c faces upwards and the clamping bolt 40c which cooperates with said surface presses against a clamping plate 80, which is provided on the rear part of the lower surface 48c of the insert 20c and which serves to enable spreading whereby to press the insert 20c by its upper surface 49c against a clamping surface 17c. The advantage which is desired in all the embodiments is also achieved in this embodiment in that, as a result of the clamping on one side, the reference dimension from one of the clamping surfaces (in the present example the upper surface) remains unaltered and is independent of the expansion of the insert caused by the clamping. Of course in the present embodiment only a limited extent of the lower surface is available for the direct securing of the insert in the support. In this respect the embodiments having one or more slits are more advantageous.

In the embodiment of FIGS. 8 and 9 the tool 22c is clamped by means of a vertical clamping screw 43c disposed on the front part of the insert and by means of an actuation member 35c whose construction is the same as the member of FIG. 3. However, this member does not effect spreading of the insert since it is disposed completely in the non-expandable part of the insert.

Thus the present embodiment has a total of three actuation members, two of which are provided solely for clamping the tool, whilst the third is provided for the sole purpose of clamping the insert in the support. In the present embodiment it can be seen that the insert includes a supporting portion 81 for the tool, and that the supporting portion extends a long way forward out of the support. The insert thus forms an extension for the tool, without the shank thereof having to be made longer than usual, and also provides additional stiffening of the tool shank. The actuation member 35c is therefore also disposed such that its clamping bolt is disposed forwardly towards the working side 13 since the shank does not fill the recess 21c up to the rear wall. The actuation devices 31c and 35c are disposed in a transverse direction. Numerous support shapes may be used instead of the H-shaped support of FIGS. 8 and 9 and the previously described box-shaped support. In a similar manner to FIGS. 8 and 9, a U-shape enables the insert to be inserted from the side without releasing the guide bars. Of course, for this purpose the side walls which stiffen the support are lacking. These ensure parallel clamping surfaces in spite of the considerable spreading forces of the insert. Of course when using the embodiment of FIGS. 6, 7 and 8, i.e. having spreading which is more effective in the rear region, the clamping force can be achieved with very much less lever action on the side walls 14 and 15 than in the embodiment of FIGS. 3 and 4. The guides may be of any type and may be provided with semi-circular serrations or may be prism-shaped in construction. It is also possible to use the guides as clamping surfaces or to employ them to achieve even greater freedom of play.

There is no cause for reluctance to use the embodiment of FIG. 8 on account of it having only one guide 45c, particularly when the width of the insert is not too small as compared with the distance between the clamping surfaces. Although it is also possible for the guide to be disposed in the rear part of the insert, the guide 45c in the front portion is particularly advantageous because it is then in the position where it is to be particularly effective, namely in the region of the cutting edge. Another great advantage is that the spreading is effected only towards one of the clamping surfaces, namely that cutting surface which is not loaded by the cutting pressure of the tool. The guide having a large surface and the advantageous construction of the inserts from one piece makes possible a guide which is simultaneously secure and little prone to oscillation and which is accompanied by relatively slight clamping pressure. The steel is securely supported even during overhead cutting and no screws or other clamping elements are engaged for the transmission of the cutting forces; in fact these support the clamping.

The clamping device according to the invention can be used for all types of turning machines. For example it is possible for the support 12 to be in the form of a revolving head or turret in that it comprises several box-shapped or U-shaped supports whose rear walls face one another. This head may then be pivotally disposed on the turning machine. It is also possible to transfer groups of tools, which are all adjusted with respect to one another, to other turning machines by clamping the entire support with the securely inserted inserts onto the other machine. Although a particularly advantageous feature of the preferred embodiments is that all clamping members and the tool can be replaced or serviced from the front it is also possible to provide access from the rear, as for example in FIGS. 8 and 9.

Numerous modifications of the embodiments described and shown are possible within the limits of the invention. Hence the actuation members may be very different in construction, being provided for example with eccentrics or conical bolts. It is for example also possible for an actuation member simultaneously to serve two clamping points in that, for example two eccentrics which actuate two pressure parts, are provided on one bolt. It is also possible to make a horizontal actuation member accessible from both sides for clamping. It is also possible to combine the function of the guide with that of the adjusting member. Thus, a slot and a bore, which correspond to the parts 54 and 66 of FIG. 4 may for example be present in the guide 45c of FIG. 8.

As has already been mentioned, it is also possible for the guides to be constructed as short bars which under certain circumstances are provided for only one insert and which can individually be adjusted without play for each insert. The slots for the engagement of the fine adjustment eccentric may be disposed on these guides. These slots may run obliquely to the support. The supports may be in the shape of a U profile having grooves on the free limbs, and parts serving as front or intermediate walls may be clamped in a positive manner into the support by means of the grooves. Intermediate walls stiffen particularly long supports by shortening the free clamping width. The front or intermediate walls may leave side apertures free through which the chips may flow away. They may also serve as stops for the inserts, possible by way of adjusting screws. Furthermore, it is possible for the inserts to be clampled on one side and inwardly against a guide surface, which may for example abut against the free edges of the side walls or lie in grooves. The guide may also be provided with adjusting devices on the inserts.

We claim:

1. A tool clamping device, usable in a turning machine in conjunction with a tool, having a working end and a shank, and wherein a material to be worked is applied to the working end of said tool from a selected direction, comprising:
   a support, adapted for mounting on said turning machine and including two rigid, parallel and mutually facing clamping surfaces;
   at least one tool holder, adapted for insertion in said support, and having means for clamping said tool shank, a first clamping surface in said selected direction from said clamping means, and a second parallel and oppositely facing clamping surface, said tool shank clamping means for engaging said tool shank in a fixed position with respect to said second clamping surface, independent of insertion and clamping of said tool holder in said support;
   spreading means on said tool holder, between said tool shank clamping means and said first clamping surface, for expanding said tool holder to clamp said tool holder between the clamping surfaces of said support;
   means for actuating said clamping means and said spreading means;
   and guide means, for guiding motion of said tool holder between said support clamping surfaces in a direction substantially perpendicular to the direction between said tool shank and the working end of said tool.

2. A tool clamping device in accordance with claim 1, wherein said support is larger than said tool holder in said guiding direction, whereby said support can accommodate a plurality of said tool holders.

3. A tool clamping device in accordance with claim 1, wherein said tool holder is relatively small in said guiding direction.

4. A tool clamping device in accordance with claim 1, wherein said support comprises a box-like structure, including opposed side walls, and said clamping surfaces comprise the inner surfaces of said side walls.

5. A tool clamping device in accordance with claim 1, wherein at least one of said clamping surfaces of said support has an edge adjacent to the working end of said tool, and wherein said guide means is disposed along said edge.

6. A tool clamping device in accordance with claim 1, wherein said guide means comprises a bar, wherein said tool holder includes a guide surface cooperating with said bar and wherein said bar is displaceable out of engagement with said surface.

7. A tool clamping device in accordance with claim 6, wherein said guide surface comprises a surface of a groove on said tool holder.

8. A tool clamping device in accordance with claim 1, wherein said spreading means includes a slit in said tool holder, said slit extending to the rear side of said tool holder away from said working end of said tool.

9. A tool clamping device in accordance with claim 1, wherein said means for actuating said clamping and said spreading means are accessible from the side of said tool holder adjacent the working end of said tool.

10. A tool clamping device in accordance with claim 1, wherein at least one of said actuating means includes an actuating element extending parallel to said clamping surfaces.

11. A tool clamping device in accordance with claim 1, wherein said actuating means includes an actuating element for actuating both said spreading and said clamping means.

12. A tool clamping device in accordance with claim 1, wherein one of said actuating means actuates only said clamping means.

13. A tool clamping device in accordance with claim 8, wherein said slit has an inner end opposite said rear side of said tool holder and wherein said actuating means exerts clamping pressure across said slit in the region of said inner end.

14. A tool clamping device in accordance with claim 1, wherein there is provided adjusting means, for displacing said tool holder along said support in the direction of said guide means, comprising eccentric means and an aperture giving access for activation of said eccentric means.

15. A tool clamping device in accordance with claim 1, wherein said spreading means includes a slit extending to the side of said tool holder adjacent to the working end of said tool, said slit being substantially parallel to said clamping surfaces, wherein said tool holder projects from said support, and wherein said actuating means includes a first actuating screw in the projecting portion of said tool holder between said slit and said first clamping surface and a second actuating screw in the projecting portion of said tool holder between said slit and said tool clamping means.

16. A tool clamping device in accordance with claim 1, wherein said actuating means includes a tapered actuating element, an actuating member and a connection between said actuating element and said actuating member for conducting both compressive and tensile forces.

17. A tool clamping device in accordance with claim 1, wherein said guide means includes a plurality of guide parts and means for clamping said guide parts in the region of said tool holder.

18. A tool clamping device in accordance with claim 1, wherein said support further includes wall members which may be selectively located between said clamping surfaces.

* * * * *